(12) United States Patent
Matasso et al.

(10) Patent No.: US 8,789,791 B2
(45) Date of Patent: Jul. 29, 2014

(54) ELECTRICAL SYSTEM AND ELECTRICAL ACCUMULATOR FOR ELECTRICAL ACTUATION AND RELATED METHODS

(75) Inventors: Anthony F. Matasso, Fort Worth, TX (US); Steven M. Iden, Dayton, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 1786 days.

(21) Appl. No.: 12/136,652

(22) Filed: Jun. 10, 2008

(65) Prior Publication Data
US 2009/0302153 A1    Dec. 10, 2009

(51) Int. Cl.
*B64C 13/50* (2006.01)

(52) U.S. Cl.
USPC ........................................ 244/99.2; 244/99.4

(58) Field of Classification Search
USPC ..................... 244/99.2, 99.4; 701/3
See application file for complete search history.

(56) References Cited

U.S. PATENT DOCUMENTS

| | | | |
|---|---|---|---|
| 4,597,463 A | 7/1986 | Barnard | |
| 4,632,205 A | 12/1986 | Lewis | |
| 4,955,560 A | 9/1990 | Nishina et al. | |
| 5,939,800 A | 8/1999 | Artinian et al. | |
| 6,568,633 B2 | 5/2003 | Dunn | |
| 6,942,048 B2 | 9/2005 | Ishikawa et al. | |
| 2003/0020436 A1* | 1/2003 | Coles et al. | 322/44 |
| 2009/0157234 A1* | 6/2009 | Breit et al. | 701/3 |

OTHER PUBLICATIONS

Konstantin P. Louganski, Sep. 30, 1999, Virginia Polytechnic Institute and State University, "Modeling and Analysis of a DC Power Distribution Syste in 21st Century Airlifters".*

* cited by examiner

*Primary Examiner* — Tien Dinh
*Assistant Examiner* — Justin Benedik
(74) *Attorney, Agent, or Firm* — Bracewell & Giuliani LLP

(57) ABSTRACT

An electrical system for driving flight control actuators, electrical accumulator, and methods for managing electrical power for an aircraft electrical system and methods of retrofitting an aircraft electrical system with an electrical accumulator are provided. The electrical system can include a bidirectional accumulator positioned in electrical communication with the plurality of flight control actuators to absorb excess electrical power regenerated by the plurality of flight control actuators and to provide supplemental power to the plurality of flight control actuators to thereby satisfy transient power requirements.

24 Claims, 4 Drawing Sheets

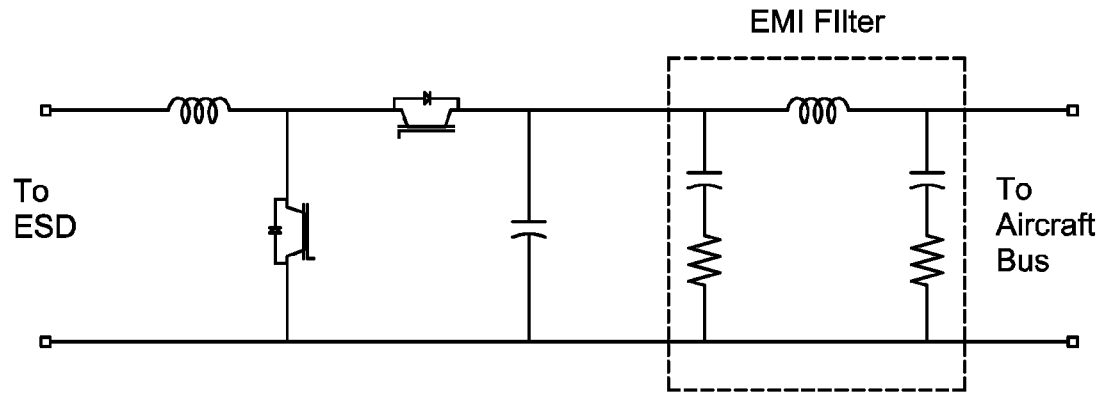
Fig. 3
Fig. 5
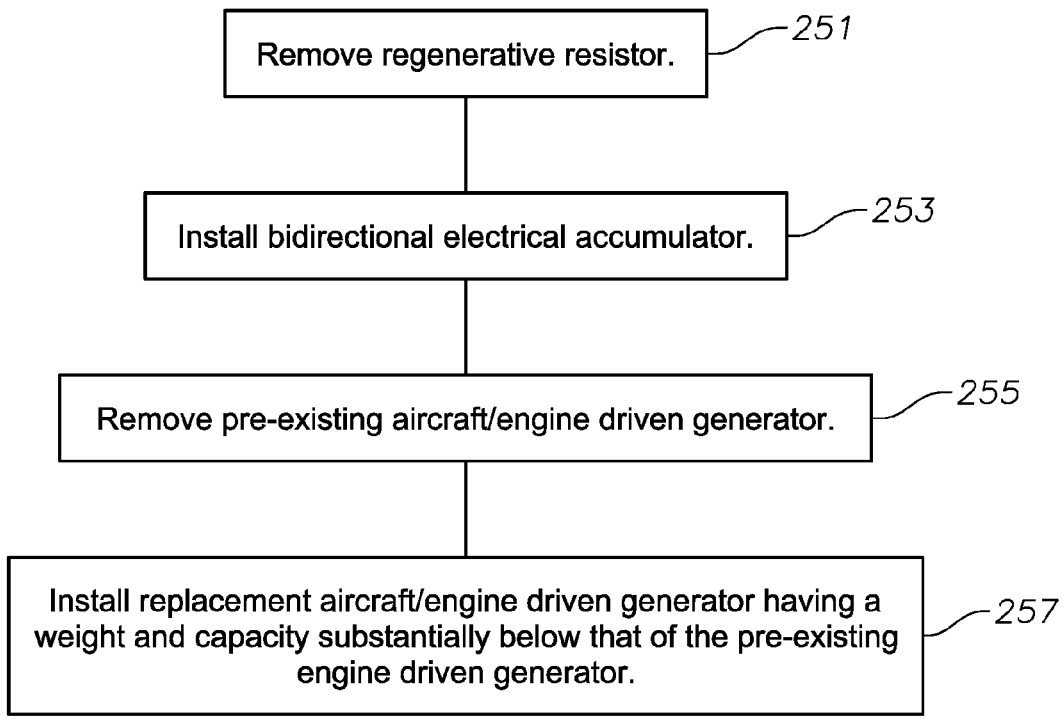

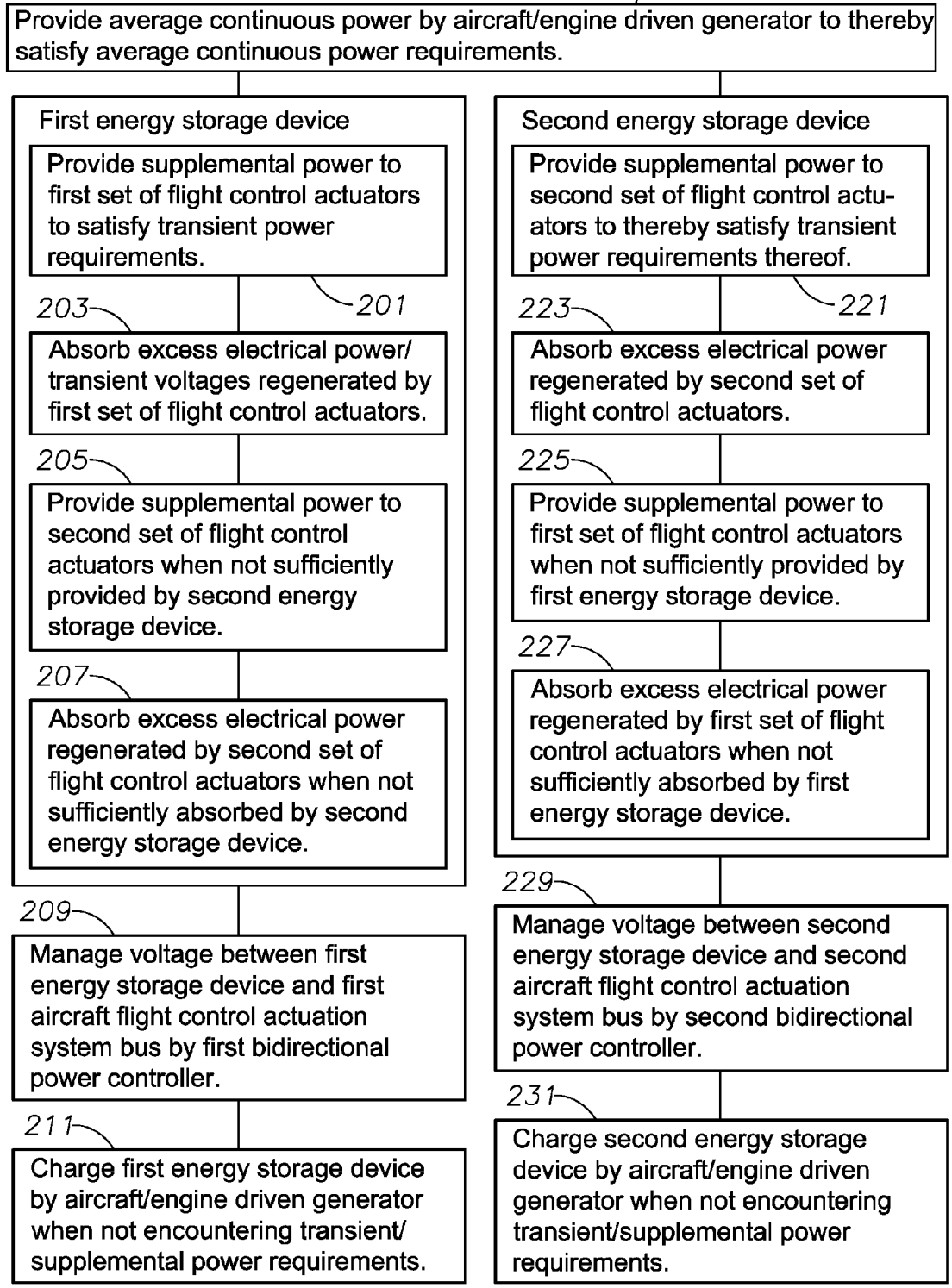

ELECTRICAL SYSTEM AND ELECTRICAL ACCUMULATOR FOR ELECTRICAL ACTUATION AND RELATED METHODS

BACKGROUND OF THE INVENTION

1. Field of the Invention

The present invention relates generally to vehicle electrical systems, and specifically to electrical control actuation systems, electrical accumulators that interface with electrical control actuation systems, and related methods of managing electrical control actuation systems and installing electrical accumulators for electrical control actuation systems.

2. Description of Related Art

Aircraft aerodynamic control surfaces such as, for example, ailerons, flaps, rudders, etc., are moved to control the roll, pitch and yaw of an aircraft. Modern aircraft have traditionally used a combination of fly-by-wire control with a centralized high-pressure hydraulic system that is capable of moving the control surfaces by translating the hydraulic pressure produced by the hydraulic pumps into linear movement in the actuator. With the advent of "more electric aircraft," the control of movement of the aerodynamic control surfaces has made the transition from a centralized continuously pressurized hydraulic system and fly-by-wire ("control-by-wire") to a "power-by-wire" electrical system utilizing electro-hydrostatic actuators which generally include a series of individual flight control component actuators each including an electrical motor driving an individual hydraulic pump, and/or a series of individual flight control component actuators each including an electrical motor driving a mechanical extension. This transition to power-by-wire has created a flight control actuation system that has short periods of high peak electric power required by the flight control actuation system as well as short periods of high peak regenerative electric power that is placed back onto the aircraft flight control actuation system bus.

In order to achieve high flight performance characteristics, the flight control actuation system must be moved at high rates. In the power-by-wire systems, this high rate movement is achieved by exercising a motor or pump, which results in a high level of power required from the electrical bus in order to move the associated aerodynamic control surface. Because high-performance control of the aerodynamic control surfaces often requires electrical breaking to make a hard stop in response to control movements by the pilot, the motor will act like a generator for a short period of time which will then generate high levels of power that are resultingly translated back onto the aircraft flight control actuation system bus.

In hydraulically powered legacy aircraft, the issues involved with respect to providing high-performance control, i.e., high peak hydraulic fluid demand and high peak regenerative hydraulic fluid feedback, have been addressed by including a large hydraulic reservoir that can absorb or produce the hydraulic fluid associated with these peak events. On modern "more electric aircraft," until now, there existed no device capable of both absorbing excess power and supplying such power for peak events. Instead, such types of problems have been at least partially addressed by incorporating into the "power-by-wire" flight control actuation systems an over sized generator having a power capacity sufficient to deliver the average amount of power required by the flight control actuation system as well as any anticipated transient power requirements, and through use of regenerative resistors. That is, the regenerative power produced by the flight control actuation system is not able to be absorbed by the generator, for example, due to backlash effects on the engine mounted accessory drive, and so, according to the state-of-the-art, such regenerative power must be dissipated ("burned off") in regenerative resistors. Notably, these peak events can cause large voltage transients on the aircraft flight control actuation system bus, which may fall outside of the bus standard/capacity. Further, as the heat created by the regenerative resistors is $I^2R$ dependant, this could result in a requirement of the aircraft to deal with on the order of kilowatts of heat, typically dealt with via active cooling by a dedicated cooling loop on the aircraft, e.g., fuel, air, Polyalphaolefin (PAO), etc., which can lead to a requirement to have an even larger generator to power the cooling unit.

The oversized generator or generators add additional weight and volume requirements to the aircraft. Further, the regenerative resistors not only waste a potential source of power, but raise heat dissipation issues that must be dealt with. Recognized by the inventors, therefore, is the need for a bidirectional electrical accumulator capable of providing the high peak power needed by the flight control actuation system, and which can absorb the regenerative power produced by the flight control actuation system. Further, recognized by the inventors is the need for a bidirectional electrical accumulator capable of supply power above and beyond what the aircraft electrical system generator or other aircraft power supply device is capable of supplying, particularly when the aircraft is in flight.

SUMMARY OF THE INVENTION

In view of the foregoing, embodiments of the present invention advantageously provide a vehicle/aircraft electrical system, electrical accumulator, and methods of managing electrical power for a vehicle/aircraft electrical system including a vehicle/aircraft control system. Embodiments of the present invention also advantageously provide an electrical system, electrical accumulator, and methods of managing both average and peak power requirements associated with an aircraft electrical flight control actuation system. Embodiments of the present invention further advantageously provide an electrical accumulator including an electrical storage device that is best suited for the specific flight control actuation application (i.e. lithium ion battery, ultracapacitor, capacitor, combination, or other energy storage device) coupled with a voltage converter/power controller configured to match and regulate the voltage of the aircraft bus powering the flight control actuators and the electrical storage device. Embodiments of the present invention advantageously overcome the inadequacies of conventional power-by-wire electrical systems through use of a bidirectional electrical accumulator electrically coupled to the aircraft flight control actuation system.

More particularly, embodiments of the present invention provide aircraft electrical systems for an aircraft having a plurality of electrically actuated aerodynamic control surfaces. For example, according to an embodiment of an aircraft electrical system, the system can include a plurality of electrically powered aircraft flight control actuators each including an electric motor operably coupled thereto and each positioned to move one of the plurality of aerodynamic control surfaces, and a bidirectional electrical accumulator positioned in electrical communication with the plurality of flight control actuators to absorb excess electrical power regenerated by the plurality of flight control actuators and to provide supplemental power to the plurality of flight control actuators to thereby satisfy transient power requirements. According to an embodiment of the present invention, the bidirectional electrical accumulator can absorb transient voltages beyond that capable of being absorbed under maximum continuous conditions by the aircraft electrical system without the addition of a regenerative absorption device and can satisfy transient power requirements beyond that capable of being supplied under maximum continuous conditions by the engine driven generator. According to an embodiment of the present invention, the bidirectional electrical accumulator can include a first energy storage device positioned to absorb excess electrical power regenerated by the plurality of flight control actuators and to provide supplemental power to the plurality of control actuators to thereby satisfy transient power requirements, and a second energy storage device positioned to redundantly absorb peak excess electrical power regenerated by the plurality of control actuators when not sufficiently absorbed by the first energy storage device and to redundantly provide supplemental power to the plurality of control actuators when not sufficiently provided by the first energy storage device. The system can further include a first power controller or converter in communication with a first aircraft flight control actuator bus and a first energy storage device to match and regulate voltage between the first energy storage device and the first aircraft flight control actuator bus, and a second power controller or converter in communication with a second aircraft flight control actuator bus and the second energy storage device to match and regulate voltage between the second energy storage device and the second aircraft flight control actuator bus.

Embodiments of the present invention also include a vehicle electrical system including a plurality of electrically powered vehicle control actuators each including an electric motor operably coupled thereto, and a bidirectional electrical accumulator positioned in electrical communication with the plurality of control actuators to provide power thereto and to receive power therefrom. Similar to that described above, the bidirectional electrical accumulator can include a first energy storage device positioned to absorb excess electrical power regenerated by the plurality of control actuators and to provide supplemental power to the plurality of control actuators, and a second energy storage device positioned to redundantly absorb peak excess electrical power regenerated by the plurality of control actuators and to redundantly provide supplemental power to the plurality of control actuators.

Embodiments of the present invention also include methods of managing electrical power for an aircraft electrical system of an aircraft having a flight control system including electrically powered flight control actuators (e.g., electro-hydrostatic actuators and/or electro-mechanical actuators). For example, such a method can include the step of absorbing regenerative power produced by a plurality of flight control actuators each having an electric motor operably coupled thereto, by a bidirectional electrical accumulator electrically coupled to the plurality of flight control actuators. The regenerative power can include transient voltages beyond that capable of being absorbed under maximum continuous conditions by the aircraft electrical system without a regenerative absorption device coupled thereto. The method can further include the step of satisfying transient power requirements beyond that capable of being supplied under maximum continuous conditions by the aircraft engine driven generator.

Embodiments of the present invention also include methods of retrofitting an aircraft electrical system of an aircraft with a bidirectional electrical accumulator adapted to provide high pulse power thereto and to receive regenerative power therefrom. For example, such a method can include the steps of removing a regenerative resistor positioned in electrical communication with a plurality of flight control actuators each having an electric motor operably coupled thereto, to absorb transient voltages beyond that capable of being absorbed under maximum continuous conditions by the aircraft electrical system without a regenerative absorption device, and installing a bidirectional electrical accumulator in electrical communication with the plurality of flight control actuators to absorb transient voltages beyond that capable of being absorbed under maximum continuous conditions by the aircraft electrical system without a regenerative absorption device installed therein. According to an embodiment of the present invention, the bidirectional electrical accumulator, when installed, also functions to satisfy transient power requirements beyond that capable of being supplied under maximum continuous conditions by an engine driven generator, fuel cell, aircraft battery, or other constant power source. The method can also include removing the aircraft's engine driven generator, and installing a second engine driven generator having a weight and capacity substantially below that of the removed engine driven generator. Advantageously, according to an embodiment of the present invention, application of the bidirectional electrical accumulator allows for installation of a lower capacity generator which, in turn, can result in an overall decrease in the weight of the aircraft leading to increase performance. Further, according to an embodiment of the present invention, such bidirectional electrical accumulator can "electrically" outperform the larger capacity generator in that it can respond to transient power requirements faster than such larger capacity generator. Additionally, the method can include installing one or more power converters as part of or separate from the electrical accumulator, to manage power between a corresponding one or more energy storage devices forming the bidirectional electrical accumulator.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 3 is a schematic diagram of a power controller according to an embodiment of the present invention;

FIG. 4 is a block flow diagram of a method of managing electrical power for an aircraft electrical system according to an embodiment of the present invention; and FIG. 5 is a block flow diagram of a method of retrofitting an aircraft electrical system to include a bidirectional electrical accumulator according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Figure 1:
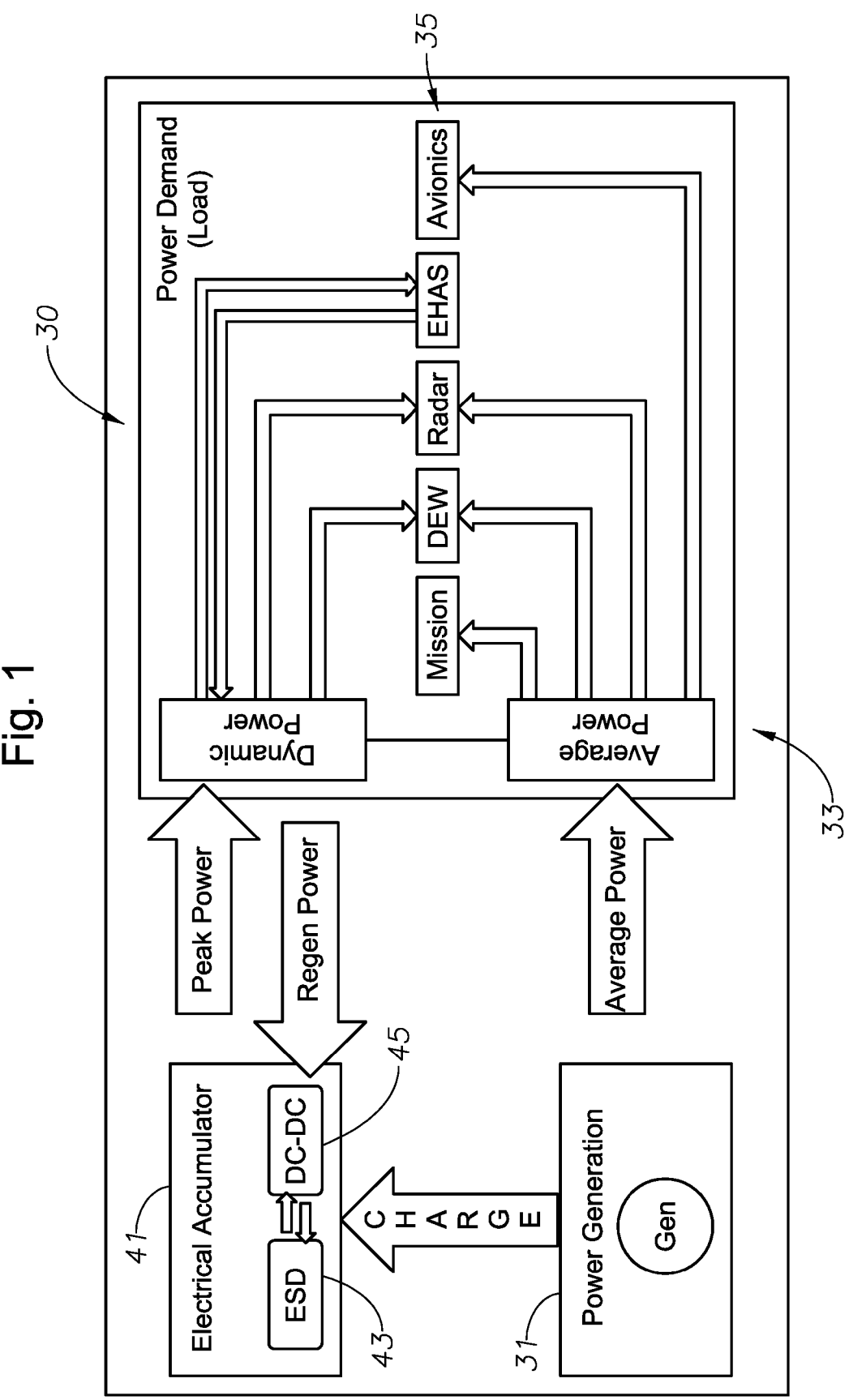
FIG. 1 is a schematic block diagram of an aircraft electrical system for an aircraft having a plurality of electrically actuated aerodynamic control surfaces according to an embodiment of the present invention.

FIG. 1 illustrates a high-level notational system diagram, which illustrates the concept of an embodiment of an aircraft electrical system 30 for providing continuous (or average) and dynamic power to various aircraft systems including various flight control actuators for moving various aerodynamic control surfaces to achieve extremely high flight performance characteristics including high rates of movement. The illustrated electrical system 30 includes a power generation device such as, for example, an engine driven generator, shown at 31 which supplies continuous or "average power" to a power distribution device, e.g., aircraft system bus, shown at 33, which, in turn, supplies power to various aircraft systems shown at 35, including radar, directed energy weapon (DEW), mission equipment, and avionics equipment. The system 30 also includes an electrical accumulator 41 including one or more of electrical storage devices 43 and a corresponding one or more power converters 45, illustrated in this example of as a DC-DC power converter for exchanging "dynamic" power between an aircraft system bus 33 and an energy storage device 43, which, in turn is illustrated as exchanging power with flight control actuators, e.g., electrohydrostatic actuators (EHAS), radar, DEW, etc. The accumulator 41 can also power other dynamic requirements such as, for example, utilities: weapons bay doors, landing gear, brakes, other actuation loads, etc., known to those skilled in the art. Beneficially, this illustration conveys how the system 30 can allow the generator 31 or other continuous power source to supply a constant power level to the loads 35, while the electrical accumulator 41 supplies the intermittent, short duration high peak power, e.g., supplemental power, and receives the power regenerated by the flight control system actuators.

Figure 2:
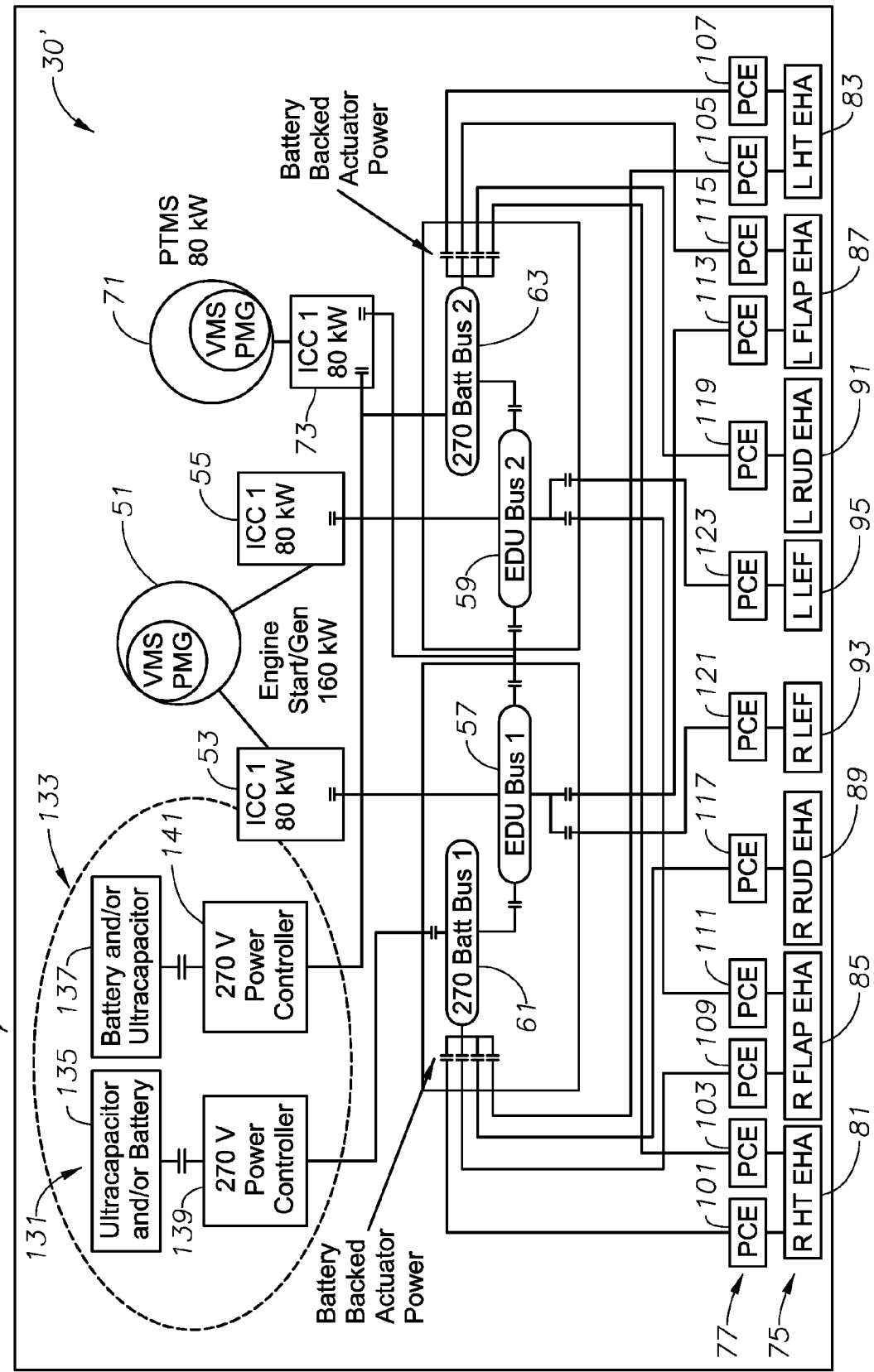
FIG. 2 is a schematic diagram of an aircraft electrical system for an aircraft having a plurality of electrically actuated aerodynamic control surfaces according to an embodiment of the present invention.

FIG. 2 provides an exemplary illustration of an electrical schematic of the basic architecture of at least a portion of an aircraft two bus electrical system 30'—particularly that related to the aircraft's flight control actuation system/subsystem, according to an embodiment of the present invention. The illustrated flight control actuation system portion of the electrical system 30' includes an engine driven generator 51 (e.g., 160 kW), a pair of inverters 53, 55 (e.g., 80 kW) receiving power from the engine driven generator 51, and a pair of electrical distribution unit (EDU) buses 57, 59 each separately primarily receiving power from a corresponding one of the inverters 53, 55. That is, EDU bus 57 primarily receives power from inverter 53, and EDU bus 59 primarily receives power from inverter 55. The EDU buses 57, 59, are further connected through a set of conduits and current limiters, etc., as known to those skilled in the art, so that any one of the inverters 53, 55 are capable of powering both EDU buses 57, 59 in the event of a failure of the primarily designated inverter. The system 30' also includes a pair of battery buses 61, 63 (e.g., 270 volt), which receive power from the EDU buses 57, 59, respectively, when the inverters 53, 55 are powering the EDU buses 57, 59, and from the aircraft battery (not shown) or others energy storage device (described below) when the battery buses 61, 63 are not receiving power through the EDU buses 57, 59. The system 30' also includes an Power & Thermal Management System (PTMS) or Integrated Power & Propulsion (IPP) start/generator 71 and a third inverter 73 receiving power from the IPP generator 71 to provide a backup electrical source in the event of in-flight failure of the engine driven generator 51 and to provide both EDU buses 57, 59 and battery buses 61, 63 power during ground operations.

The system 30' also includes the various flight control actuators 75 positioned to manipulate the various aerodynamic surfaces of the aircraft, which each receive power through one or more power control electronics (PCEs) 77, which, in turn, receive power from one or more of the battery buses 61, 63, or EDU buses 57, 59, and which include the electronics required for controlling the power and the position commands to the flight control actuators 75 and monitoring actuator responses, etc., as known to those skilled in the art. The flight control actuators 75 can include those for the various aerodynamic control surfaces, which in this exemplary embodiment, include the right and the left horizontal tail ("HT") 81, 83, the right and the left flaps ("FLAP") 85, 87, the right and the left rudder ("RUD") 89, 91, and the right and the left leading edge flaps ("LEF") 93, 95.

To provide redundancy, the right horizontal tail actuator 81 can interface with a first power control electronic 101 which receives power from the first battery bus 61, and a second power control element 103 which receives power from the second battery bus 63. The left horizontal tail actuator 83 can interface with a first power control electronic 105 which receives power from the first battery bus 61, and a second power control element 107 which receives power from the second battery bus 63. The right flap actuator 85 can interface with a first power control electronic 109 which receives power from the first battery bus 61, and a second power control element 111 which receives power from the second EDU bus 59. The left flap actuator 87 can interface with a first power control electronic 113 which receives power from the first EDU bus 57, and a second power control element 115 which receives power from the second battery bus 63. The right rudder actuator 89 can interface with a power control electronic 117 which receives power from the first battery bus 61. The left rudder actuator 91 can interface with a power control electronic 119 which receives power from the second battery bus 63. The right leading edge flap actuator 93 can interface with a power control electronic 121 which receives power from the first EDU bus 57. The left leading edge flap actuator 95 can interface with a power control electronic 123, which receives power from the second EDU bus 59. According to the illustrated embodiment of the representative aircraft, the right and left rudders 89, 91, and the right and left leading edge flaps 93, 95, are redundant between each other, and thus, are not configured to interface with redundant power control elements 77. Note, the above described configuration is by way of example. Other wiring configurations are within the scope of the present invention.

According to an embodiment of the present invention, the electrical system 30' includes a bidirectional electrical accumulator 130, for example, having two independent bidirectional electrical accumulators 131, 133, both individually and collectively positioned to absorb transient voltages beyond that capable of being absorbed under maximum continuous conditions by the electrical system 30' without the addition of a regenerative absorption device and to satisfy transient power requirements beyond that capable of being supplied under maximum continuous conditions by the engine driven generator 51. This can be particularly beneficial when the engine driven generator 51, fuel cell, onboard aircraft battery, or other constant power source, is one not otherwise having the capacity to meet dynamic demands substantially above average continuous requirements, or if it is desired to have such a smaller size engine driven generator 51 in order to enhance aircraft weight management. Each bidirectional electrical accumulator 130, 131, 133, can contain an energy storage device 135, 137, and a power controller/converter 139, 141, which together provide redundancy in the case of a failure of either one of the energy storage devices 135, 137, either one of the power converters 139, 141, either one of the buses 57, 59, 61, 63. Note, although illustrated as being grouped together, accumulators 131, 133, energy storage devices 135, 137, and/or power converters 139, 141, can be, for example, implemented as separate components each in separate housings, as pairs of like components, or as sets of functional pairs such as, for example, an energy storage device 135 and power converter 139 combination forming an independently functional electrical accumulator 131 in one housing, and the other energy storage device 137 and power converter 141 combination forming an independently functional electrical accumulator 133 in a second housing. Note further, although the electrical system 30' is illustrated as having two sets of energy storage devices, two sets of power converters, and two sets of buses, for redundancy considerations; various other configurations employing less than or more than two system combinations are within the scope of the present invention.

According to the illustrated embodiment of the present invention, each electrical accumulator 131, 133, directly supports its respective aircraft battery bus 61, 63, providing peak power, regeneration management, and power quality control, and redundantly supports the other bus 61, 63. This architecture provides redundancy such that, in the case of a single failure, electrical system 30' can provide/maintain sufficient electrical power to at least one or more of each type of flight control actuator 75 required to maintain safe aircraft handling characteristics. According to an embodiment of the present invention, each of the energy storage devices 135, 137, for example, can be in the form of a battery, e.g. lithium ion battery, having a peak voltage capability of approximately 250-350 Vdc and an energy capability of approximately 5-6 amp hours at 270V for approximately at least 0.5 hours, and more preferably, 1.0 hours; or a capacitor, e.g., ultracapacitor, having a peak power capability and regeneration absorption capability of between approximately 250-300 kW for at least 0.5 seconds (125-150 kW per bus for a two bus system). According to another embodiment of the present invention, the energy storage devices 135, 137, can each be in the form of a combination of both a battery and a capacitor in order to capitalize on the advantages of each while neutralizing their individual limitations. According to yet another embodiment of the present invention, the energy storage device 135 can be both an ultracapacitor and a lithium-ion battery, and the energy storage device 137 can be an ultracapacitor, to thereby provide sufficient energy requirements at minimum weight.

The power converters 139, 141, can be in the form of bi-directional power controllers/converters capable of transferring power back and forth between the ESD buses 57, 59 and the battery buses 61, 63 (e.g., 270 Vdc aircraft buses). According to an embodiment of the present invention, the power converters 139, 141, can be positioned either internal or very close externally to the energy storage device 135, 137, particularly when in the form of a lithium-ion battery, and can provide precise voltage regulation as well as fault current management at high speed from the battery. Note, although the system 30' is primarily illustrated as functioning with 270 volts as it is the most commonly used configuration, other configurations are within the scope of the present invention. Other typical configurations can include 115 Vac, and 28 Vdc depending upon the configuration of the aircraft. Correspondingly, power controller/converters 139, 141, can be in the form of DC-DC converters for interface with a 28 Vdc bus, DC-AC converters for interface with a 115 Vac aircraft bus, etc. Accordingly, the power converters 139, 141, can have corresponding voltage capabilities required to interface with the associated aircraft bus voltage, and can include various additional interface components such as, for example, inverters, etc., which can be provided if the aircraft buses are alternating current.

Electric actuation by a flight control actuator 75 acts like a constant power load regarding both supply power and regenerative power. Nevertheless, due to the different types of aircraft bus voltage types (e.g., 115 Vac/270 Vdc/28 Vdc), power requirements can range between 0~500 kW+ and energy requirements and correspondingly range between 0~500 kJ+, depending upon the configuration. For example, in a typical fighter aircraft, total actuation regenerative power can range between 150~200 kW and total actuation regenerative energy can range between 20~40 kJ. Similarly, total supply power requirements can range between 20~40 kW/ms with voltage requirements equal to that of the full operating range of the aircraft and current requirements only limited by the capability of the equipment being used, ie: IGBTs (switching), capacitors/inductors, contactors, wiring. The continuous power duration, e.g., 20~40 kW, is limited to the amount of energy stored in the electrical storage device 135, 137, and should be sized to share the constant power load of the actuation with the generator 51. A fighter aircraft will typically require an electrical accumulator having a different capacity than would be required of a cargo or passenger plane. MIL-STD-704, incorporated herein by reference, describes the various bus voltage conditions for aircraft.

For primary flight controls, the peak power required for an actuator is dependant on how much load is exerted on the flight control surface, the rate the surface is moved, and how the actuator is attached to the surface. It is also dependant on the inertia of the motor/pump that is used to move the actuator. The duration of the load on the EAU is dependant on the stroke of the actuator (top to bottom) and the rate the actuator is moved. The regenerative energy is created from stopping the motor, and it is dependant on the inertia of the machine and how quickly it must stop. Cargo/Passenger Type Aircraft, for example, will typically have smaller peak power, but longer duration, with low duty ratio for its actuation movements. The amount of energy will also generally be due to the size of the aircraft, with the largest aircraft requiring the largest amount of energy. High Performance Fighter Aircraft, for example, will typically have the highest peak and regenerative power. For this type of aircraft, although the duration will generally be the shortest, it will have the highest duty ratio. For Small Reconnaissance Aircraft, for example, this type of aircraft will be similar to a cargo aircraft, but will be scaled down due to its size.

Due to aircraft weight and volume restrictions and due to a desire to function at an operating point located below Paschen's partial pressure voltage breakdown curves, it is desired that the energy storage devices 135, 137, be maintained at a lower voltage than voltage carried by the respective buses, i.e., preferably at least 200V but below below 350V for a 270 Vdc system. Further, although lithium-ion batteries have an acceptable storage capacity, they have a wide temperature and charge based voltage curve which adversely impacts electrical load designs. Accordingly, for a 270 Vdc aircraft battery bus 61, 63, the energy storage device 135, 137, should generally be configured to be maintained at below 270 Vdc, and preferably below 250 Vdc. According to such configuration and as perhaps best shown in FIG. 3, the power converters 139, 143, can be configured to have a "boost" capability in supplying power to the respective buses, while maintaining "buck" capability for handling the regeneration management. Note, the illustrated embodiment of the power converter 139, 141, includes an electromagnetic interference (EMI) output filter in compliance with MIL-STD-461E requirements. Other power converter configurations known to those skilled in the art, with or without an EMI filter, however, are within the scope of the present invention.

According to an embodiment of the present invention, the first energy storage device 135 is in the form of an ultracapacitor and the second energy storage device 137 is in the form of a lithium-ion battery, or vice versa. When configured so that either one of the energy storage devices 135, 137, can provide high demand supply power and receive high regenerative power, such configuration beneficially allows the ultracapacitor and lithium ion battery technologies to be interlaced and balanced to use the peak power capability of ultracapacitors, while capitalizing upon the unique energy storage capability of lithium-ion battery technologies, across each of the flight control system actuators 75. Various other configurations/combinations are, of course, within the scope of the present invention.

As shown in FIG. 4, embodiments of the present invention also include methods of managing electrical power for an aircraft electrical system of an aircraft having a flight control system including electrically powered flight control actuators (e.g., electro-hydrostatic actuators and/or electro-mechanical actuators). For example, such a method can include the step of providing average continuous power by the aircraft/engine driven generator 51, 71, to thereby satisfy average continuous power requirements (block 200). The method also includes a first electrical accumulator 131 or energy storage device 135 alone or in conjunction with a power converter 139, for example, performing the following steps/functions: providing supplemental power to a first plurality or set of flight control actuators 75, for example, either directly through battery bus 61 or indirectly through the EDU bus 57, to satisfy transient power requirements (block 201), absorbing excess electrical power/transient voltages regenerated by first plurality of flight control actuators 75 (block 203), providing supplemental power to a second plurality or set of flight control actuators 75 when not sufficiently provided by a second energy storage device 137 (block 205), and absorbing excess electrical power regenerated by second plurality of flight control actuators 75 when not sufficiently absorbed by the second energy storage device 137 (block 207). The method can also include managing voltage between first energy storage device 135 and a first aircraft flight control actuation system bus (e.g., battery bus 61) by a first bidirectional power controller 139 (block 209), and charging the first energy storage device 135 by aircraft/engine driven generator 51 or fuel cell, PTMS 71, or other continuous power supply (e.g., Ram Air Turbine (RAT), etc., or alternatively, the aircraft battery) when not encountering transient/supplemental power requirements (block 211).

The method can also include a second electrical accumulator 133 or energy storage device 137 alone or in conjunction with a power converter 141, for example, performing the following steps/functions: providing supplemental/transient power to the second plurality or set of flight control actuators 75, for example, directly through battery bus 63 or indirectly through EDU bus 59, to thereby satisfy transient power requirements thereof (block 221), absorbing excess electrical power regenerated by second plurality of flight control actuators 75 (block 223), providing supplemental power to the first plurality of flight control actuators 75 when not sufficiently provided by first energy storage device 135 (block 225), and absorbing excess electrical power regenerated by the first set of flight control actuators 75 when not sufficiently absorbed by first energy storage device (block 227). The method can also include managing voltage between second energy storage device 137 and a second aircraft flight control actuation system bus (e.g., battery bus 63) by a second bidirectional power controller 141 (block 229), and charging the second energy storage device 137 by the aircraft/engine driven generator 51, 71 when not encountering transient/supplemental power requirements (block 231).

As shown in FIG. 5, embodiment of the present invention also include methods of retrofitting an aircraft electrical system of an aircraft with a bidirectional electrical accumulator adapted to provide high pulse power thereto and to receive regenerative power therefrom. For example, such a method can include the steps of removing a regenerative resistor (not shown) from a pre-existing electrical system (block 251), and installing a bidirectional electrical accumulator, such as, for example, combined electrical accumulator 130 or one or more individual electrical accumulators 131, 133 containing an energy storage device 135, 137, and preferably, a power converter 139, 141 (block 253). The method can also include the steps of removing a pre-existing (oversized) aircraft/engine driven generator 51 (block 255), and installing a replacement aircraft/engine driven generator 51 having a weight and capacity substantially below that of the pre-existing engine driven generator (block 257). Beneficially, because the bidirectional electrical accumulator(s) 130, 131, 133, can satisfy transient (dynamic) power requirements above that needed on a continuous basis, the aircraft/engine driven generator 51 need not have as high an output capacity as would be the case if the generator 51 was required to provide both average power requirements and dynamic power requirements (e.g., all expected transient power requirements). That is, if the generator 51 were sized, for example, to only deliver constant power to the aircraft, the generator could be optimized through its materials and size to reduce its weight and volume. Also, the cooling apparatus (not shown) needed to cool the generator could be reduced in size, capacity, and weight. Further, removal or reduction in size of the cooling apparatus (not shown) needed to cool the regenerative resistor would synergistically result in a decrease in required generator capacity, which further reduces the required size, capacity, and weight of the generator. Further, the resulting total weight change of the removal of the regenerative resistor, removal of the cooling apparatus associated with the regenerative resistor or reduction in size of the cooling apparatus if it also provides cooling of the generator, and downsizing of the aircraft/engine driven generator 51, even with the addition of the electrical accumulator 130, 131, 133, can beneficially result in an overall decrease in the total weight of the aircraft and volume required of the flight control system components, on the order of 10~20+%. Further, the electrical accumulator 130, 131, 133, can provide increased performance to and by the flight control actuators 75 by providing a quicker response to transient voltage needs and possible by the pre-existing (oversized) aircraft/engine driven generator 51.

According to an embodiment of the present invention, through employment of the electrical accumulator 130, 131, 133, beneficially, the electrical and actuation systems on the aircraft can be optimized for performance, weight and volume. The bus power quality (MIL-STD-704) can be improved. The life of the components would be expected to grow (especially the generator). The thermal efficiency of the system is improved, i.e., the system overall delivers less heat to the aircraft. Further, during an emergency operation and aircraft without such electrical accumulator 130, 131, 133, would be limited in its constant power delivery, and more so with its peak power delivery. Because of this limitation the flight control actuation system would be limited in the amount of power it can draw, and, as such, would limit the flying qualities of the aircraft. Essentially the aircraft would fly sluggish and would likely not be able to continue its mission. The addition of the electrical accumulator 130, 131, 133, allows the flight control actuation system to continue to perform at full capability during an emergency operation because of the addition of peak power capability.

Various embodiments of the present invention provide several advantages. For example, an embodiment of the present invention provides a centralized solution to the high power requirements/power regeneration associated with power-by-wire electrical systems through use of a centrally oriented bidirectional electrical accumulator. Further, according to another embodiment of the present invention, various embodiments of the electrical accumulator have the ability to "fill in" and provide the energy required for peak events. Such functions can advantageously allow an overall system weight reduction between the power generating device, the electrical actuation system, and the electrical accumulator. Further, these devices can advantageously be sized appropriately in order to reduce the overall weight, while maintaining or improving the aircraft flight performance. Each device can be designed in order to provide the function that it is best suited to provide. For example, the electrical accumulator can provide the short duration high peak power with a high current rate of rise. I.e., in such configuration, electrical accumulator can deliver and absorb the excess power required of an electrical load with high pulse and high regenerative power. The aircraft generator can provide a high level of constant power. The electrical flight control actuation system can be sized to maximize its flight control performance capabilities. The aircraft electrical system, through application of the electrical accumulator, can enable the flight control actuation system portion to perform at a higher level, which can resultingly improve the handling characteristics of the aircraft during both normal and emergency operations. In addition to application of its primary function, according to an embodiment of the present invention, the electrical accumulator can further provide high pulse power to other devices on the aircraft including, but not limited to, the radar and directed energy weapons.

Advantageously, the management of peak and regenerative power capability according to an embodiment of the present invention, effectively reduces the impacts of the peak requirements and the effects of the regenerative power to the primary sources of power that are unduly impacted by such peak requirements and regenerative power. Such peak and regenerative power also impacts electrical loads (e.g., the electric actuators, radar, DEW, utilities) that until now, required extreme design measures to manage both peak and regenerative power demands. By using staggered power converter topologies, ultracapacitor and lithium ion battery technologies can be interlaced and balanced to use the peak power capability of the ultracapacitors, while capitalizing upon the unique energy capability of lithium-ion battery technologies.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the foregoing identified battery buses need not carry that specific nomenclature, and need not be specifically powered by a battery. Further, the buses need not be 270 volts, but can be whatever voltage utilized by the flight control actuation system. Still further, the system power can be primarily alternating current power. Still further, the buses need not the direct current buses. Accordingly, the electrical accumulator and power converters can be configured to provide sufficient power based on the specific desired voltage or type of voltage of the buses. Additionally, although the aircraft continuous power source supplemented by the bidirectional electrical accumulator was described primarily in the form of an aircraft/engine driven generator or a fuel cell, and power & thermal management system or integrated power & propulsion start/generator, other primary aircraft continuous power sources are within the scope of the present invention.

That claimed is:

1. An aircraft electrical system for an aircraft having a plurality of electrically actuated aerodynamic control surfaces, comprising:
    a plurality of electrically powered aircraft flight control actuators each including an electric motor operably coupled thereto and each positioned to move one of the plurality of aerodynamic control surfaces;
    one or more electrical distribution unit buses operably electrically coupled to the plurality of electrically powered aircraft flight control actuators; and
    a bidirectional electrical accumulator in electrical communication with the plurality of flight control actuators through the one or more electrical distribution unit buses, and positioned and configured to absorb excess electrical power regenerated by the plurality of flight control actuators and positioned and configured to provide supplemental power to the plurality of flight control actuators to thereby satisfy transient power requirements,
    the bidirectional accumulator comprising one or more power controllers and one or more energy storage devices,
    the one or more power controllers configured to maintain a voltage of each of the one or more energy storage devices and to manage a voltage between the one or more energy storage devices and the one or more electrical distribution unit buses to provide for charging the one or more energy storage devices, when not encountering transient or supplemental power requirements,
    the one or more power controllers in conjunction with the one or more energy storage devices configured to absorb the excess electrical power and transient voltages regenerated by the plurality of electrically powered flight control actuators defining a buck capability, and to provide the supplemental power to the plurality of electrically powered flight control actuators when encountering the transient or supplemental power requirements defining a boost capability.

2. The aircraft electrical system as defined in claim 1,
    wherein the electrical system includes a primary aircraft engine driven generator or fuel cell configured to provide continuous power, and wherein the bidirectional electrical accumulator is configured to absorb transient voltages beyond that capable of being absorbed under maximum continuous conditions by the aircraft electrical system without a regenerative resister and to satisfy transient power requirements beyond that capable of being supplied under maximum continuous conditions by the engine driven generator or fuel cell; and wherein the one or more power controllers is configured to maintain the voltage of each of the one or more devices below the desired continuous voltage maintained on the one or more electrical distribution unit buses.

3. The aircraft electrical system as defined in claim 1, wherein the one or more energy storage devices of the bidirectional electrical accumulator includes a first energy storage device comprising an ultracapacitor having a minimum rating of 25 kilowatts, and a second energy storage device comprising a lithium ion battery having a minimum rating of 2.5 amp-hours.

4. The aircraft electrical system as defined in claim 1, wherein the one or more energy storage devices of the bidirectional electrical accumulator includes:
   a first energy storage device positioned to absorb excess electrical power regenerated by the plurality of flight control actuators and to provide supplemental power to the plurality of control actuators to thereby satisfy transient power requirements; and
   a second energy storage device positioned to redundantly absorb peak excess electrical power regenerated by the plurality of control actuators when not sufficiently absorbed by the first energy storage device and to redundantly provide supplemental power to the plurality of control actuators when not sufficiently provided by the first energy storage device.

5. The aircraft electrical system as defined in claim 1, wherein the plurality of flight control actuators is a first plurality of flight control actuators, wherein the aircraft electrical system further comprises a second plurality of electrically actuated flight control actuators each including an electrical motor operably coupled thereto, and wherein the one or more energy storage devices of the bidirectional electrical accumulator includes a first energy storage device and a second energy storage device:
   the first energy storage device positioned to absorb excess electrical power regenerated by the first plurality of flight control actuators and to provide supplemental power to the first plurality of control actuators to thereby satisfy transient power requirements, and to redundantly absorb peak excess electrical power regenerated by the second plurality of flight control actuators when not sufficiently absorbed by the second energy storage device and to redundantly provide supplemental power to the second plurality of flight control actuators when not sufficiently provided by the second energy storage device; and
   the second energy storage device positioned to absorb excess electrical power regenerated by the second plurality of flight control actuators and to provide supplemental power to the second plurality of control actuators to thereby satisfy transient power requirements, and positioned to redundantly absorb peak excess electrical power regenerated by the first plurality of control actuators when not sufficiently absorbed by the first energy storage device and to redundantly provide supplemental power to the first plurality of control actuators when not sufficiently provided by the first energy storage device.

6. A vehicle electrical system, comprising:
   a plurality of electrically powered vehicle control actuators each including an electric motor operably coupled thereto;
      a first vehicle electrical bus positioned in electrical communication with the plurality of flight control actuators, and
      a second vehicle electrical bus positioned in electrical communication with the plurality of flight control actuators; and
   a bidirectional electrical accumulator positioned in electrical communication with the plurality of control actuators and configured to provide power thereto and to receive power therefrom, to absorb regenerative power for the first electrical bus sufficient to maintain bus voltage within maximum continuous bus ratings thereof and to absorb regenerative power for the second electrical bus sufficient to maintain bus voltage within maximum continuous bus ratings thereof, the bidirectional electrical accumulator including:
      a first energy storage device positioned in electrical communication with the first vehicle electrical bus and configured to provide power to each of the plurality of flight control actuators and to receive and absorb excess electrical power regenerated by the plurality of control actuators and to provide supplemental power to the plurality of control actuators,
      a second energy storage device positioned in electrical communication with the second vehicle electrical bus to redundantly provide power to each of the plurality of flight control actuators and to redundantly receive and absorb peak excess electrical power regenerated by the plurality of control actuators and to redundantly provide supplemental power to the plurality of control actuators,
      a first power converter in communication with the first vehicle electrical bus and the first energy storage device to match and regulate voltage between the first energy storage device and the first vehicle electrical bus, the first energy storage device in combination with the first power converter configured to absorb the regenerative power sufficient to maintain bus voltage of the first vehicle electrical bus within maximum continuous bus ratings, and
      a second power converter in communication with the second vehicle electrical bus and the second energy storage device and configured to match and regulate voltage between the second energy storage device and the second vehicle electrical bus, the second energy storage device in combination with the second power converter configured to absorb the regenerative power sufficient to maintain bus voltage of the second vehicle electrical bus within maximum continuous bus ratings.

7. The vehicle electrical system as defined in claim 6, wherein the vehicle is an aircraft having an engine driven generator, and wherein the first energy storage device is positioned and configured to absorb transient voltages beyond that capable of being absorbed under maximum continuous conditions by the vehicle electrical system without a regenerative absorption device and to satisfy transient power requirements beyond that capable of being supplied under maximum continuous conditions by the engine driven generator;
   wherein the first power converter is configured to maintain the voltage the first energy storage device below the desired continuous voltage maintained on the first of vehicle electrical bus; and
   wherein the second power converter is configured to maintain the voltage of the second energy storage device allows the desired continuous voltage maintained on the second vehicle electrical bus.

8. The vehicle electrical system as defined in claim 6, wherein the first energy storage device comprises an ultracapacitor having a minimum rating of 25 kilowatts, and wherein the second energy storage device comprises a lithium ion battery having a minimum rating of 2.5 amp-hours.

9. The vehicle electrical system as defined in claim 6,
wherein the vehicle is an aircraft having a plurality of aerodynamic control surfaces;
wherein the plurality of vehicle control actuators is a plurality of aircraft flight control actuators each positioned to move one of the plurality of aerodynamic control surfaces;
where the first vehicle electrical bus is a first direct current (DC) bus;
wherein the second vehicle electrical bus is a second DC bus;
wherein the first power converter is a DC-DC power converter; and
wherein the second power converter is a second DC-DC power converter.

10. The vehicle electrical system as defined in claim 9, wherein the first energy storage device comprises a capacitor having a minimum rating of 25 kilowatts, and wherein the second energy storage device comprises a capacitor having a minimum rating of 25 kilowatts and a battery having a minimum rating of 2.5 amp-hours.

11. The vehicle electrical system as defined in claim 9,
wherein the plurality of aircraft flight control actuators is a first plurality of flight control actuators;
wherein the system further comprises a second plurality of electrically actuated vehicle flight control actuators each including an electrical motor operably coupled thereto;
wherein the second energy storage device and the second vehicle DC bus are positioned in electrical communication with the second plurality of flight control actuators to provide power to each of the second plurality of flight control actuators and to receive power regenerated by the second plurality of flight control actuators; and
wherein the first energy storage device and the first vehicle DC bus are positioned in electrical communication with the second plurality of flight control actuators to redundantly provide power to each of the second plurality of flight control actuators and to redundantly receive power regenerated by the second plurality of flight control actuators.

12. The vehicle electrical system as defined in claim 6, wherein the first energy storage device comprises an ultracapacitor, and wherein the second energy storage device comprises a lithium ion battery.

13. The aircraft electrical system as defined in claim 1,
wherein the plurality of flight control actuators is a first plurality of flight control actuators;
wherein the aircraft electrical system further comprises a second plurality of flight control actuators;
wherein the one or more energy storage devices of the bidirectional electrical accumulator includes:
a first energy storage device electrically coupled to the first plurality of flight control actuators and redundantly coupled to a second plurality of flight control actuators, and
a second energy storage device electrically coupled to the second plurality of flight control actuators and redundantly coupled to the first plurality of flight control actuators;
wherein the first energy storage device in conjunction with the one or more controllers is configured to absorb the excess electrical power regenerated by the first plurality of flight control actuators, and to absorb the excess electrical power regenerated by the second plurality of flight control actuators when not sufficiently absorbed by the second energy storage device, and
wherein second first energy storage device in conjunction with the one or more controllers is configured to absorb the excess electrical power regenerated by the second plurality of flight control actuators, and to absorb the excess electrical power regenerated by the first plurality of flight control actuators when not sufficiently absorbed by the first energy storage device.

14. The aircraft electrical system as defined in claim 1,
wherein the one or more electrical distribution unit buses comprises
a first vehicle direct current (DC) bus positioned in electrical communication with the plurality of flight control actuators, and
a second vehicle DC bus positioned in electrical communication with the second plurality of flight control actuators; and
wherein the one or more energy storage devices comprises:
a first energy storage device positioned in electrical communication with the first vehicle DC bus and configured to provide power to each of the plurality of flight control actuators and to receive and absorb excess electrical power regenerated by the plurality of control actuators and to provide supplemental power to the plurality of control actuators, and
a second energy storage device positioned in electrical communication with the second vehicle DC bus to redundantly provide power to each of the plurality of flight control actuators and to redundantly receive and absorb peak excess electrical power regenerated by the plurality of control actuators and to redundantly provide supplemental power to the plurality of control actuators,
wherein the one or more power converters comprises:
a first DC-DC power converter in communication with the first vehicle DC bus and the first energy storage device to match and regulate voltage between the second energy storage device and the first vehicle DC bus, the first energy storage device in combination with the first DC-DC power converter configured to absorb the regenerative power sufficient to maintain bus voltage of the first vehicle DC bus within maximum continuous bus ratings, and
a second DC-DC power converter in communication with the second vehicle DC bus and the second energy storage device and configured to match and regulate voltage between the second energy storage device and the second vehicle DC bus, the second energy storage device in combination with the second DC-DC power converter configured to absorb the regenerative power sufficient to maintain bus voltage of the second vehicle DC bus within maximum continuous bus ratings.

15. The aircraft electrical system as defined in claim 1,
wherein the one or more electrical distribution unit buses comprises
a first vehicle direct current (DC) bus positioned in electrical communication with the plurality of flight control actuators, and
a second vehicle DC bus positioned in electrical communication with the plurality of flight control actuators;
wherein the one or more energy storage devices comprises:
a first energy storage device comprising an ultracapacitor positioned in electrical communication with the first vehicle DC bus and configured to provide power to each of the plurality of flight control actuators and to receive and absorb excess electrical power regenerated by the plurality of control actuators and to provide supplemental power to the plurality of control actuators, and a second energy storage device comprising a battery positioned also in electrical communication with the first vehicle DC bus to redundantly provide power to each of the plurality of flight control actuators and to redundantly receive and absorb peak excess electrical power regenerated by the plurality of control actuators and to redundantly provide supplemental power to the plurality of control actuators, a second DC-DC power converter in communication with the second vehicle DC bus and the second energy storage device and configured to match and regulate voltage between the second energy storage device and the second vehicle DC bus, the second energy storage device in combination with the second DC-DC power converter configured to absorb the regenerative power sufficient to maintain bus voltage of the second vehicle DC bus within maximum continuous bus ratings, wherein the one or more power converters comprises:
a first DC-DC power converter in communication with the first vehicle DC bus and the first and the second energy storage devices to match and regulate voltage between the first and second energy storage devices and the first vehicle DC bus, the first and second energy storage devices in combination with the first DC-DC power converter configured to absorb the regenerative power sufficient to maintain bus voltage of the first vehicle DC bus within maximum continuous bus ratings;

wherein the bidirectional accumulator is a first bidirectional accumulator; and wherein the aircraft electrical system further includes a second bidirectional accumulator in electrical communication with the second plurality of flight control actuators through the second electrical distribution unit bus, and positioned and configured to absorb excess electrical power regenerated by the second plurality of flight control actuators and positioned and configured to provide supplemental power to the second plurality of flight control actuators to thereby satisfy transient power requirements, the second bidirectional accumulator comprising:
a first energy storage device comprising an ultracapacitor positioned in electrical communication with the second vehicle DC bus and configured to provide power to each of the plurality of flight control actuators and to receive and absorb excess electrical power regenerated by the plurality of control actuators and to provide supplemental power to the plurality of control actuators, and a second energy storage device comprising a battery also positioned in electrical communication with the second vehicle DC bus to redundantly provide power to each of the plurality of flight control actuators and to redundantly receive and absorb peak excess electrical power regenerated by the plurality of control actuators and to redundantly provide supplemental power to the plurality of control actuators, a second DC-DC power converter in communication with the second vehicle DC bus and the first and second energy storage devices and configured to match and regulate voltage between the first and second energy storage devices and the second vehicle DC bus, the first and second energy storage devices in combination with the second DC-DC power converter configured to absorb the regenerative power sufficient to maintain bus voltage of the second vehicle DC bus within maximum continuous bus ratings.

16. A method of managing electrical power for an aircraft electrical system of an aircraft comprising an aircraft flight control system including a plurality of electrically powered flight control actuators each positioned to move one of a plurality of aerodynamic control surfaces, one or more electrical distribution unit buses operably electrically coupled to the plurality of electrically powered aircraft flight control actuators, and a bidirectional electrical accumulator in electrical communication with the plurality of flight control actuators and positioned and configured to absorb excess electrical power regenerated by the plurality of flight control actuators and positioned and configured to provide supplemental power to the plurality of flight control actuators to thereby satisfy transient power requirements, the bidirectional accumulator comprising one or more power controllers and one or more energy storage devices, the one or more power controllers configured to maintain a voltage of each of the one or more energy storage devices and to manage a voltage between the one or more energy storage devices and the one or more electrical distribution unit buses to provide for charging the one or more energy storage devices, when not encountering transient or supplemental power requirements, the one or more power controllers in conjunction with the one or more energy storage devices configured to absorb the excess electrical power and transient voltages regenerated by the plurality of electrically powered flight control actuators defining a buck capability, and to provide the supplemental power to the plurality of electrically powered flight control actuators when encountering the transient or supplemental power requirements defining a boost capability, the method comprising the step of:
absorbing regenerative power produced by the plurality of flight control actuators each having an electric motor operably coupled thereto to move one of the plurality of aerodynamic control surfaces, the absorbing performed by the bidirectional electrical accumulator electrically coupled to the plurality of flight control actuators.

17. The method as defined in claim 16, wherein the step of absorbing regenerative power includes absorbing transient voltages beyond that capable of being absorbed under maximum continuous conditions by the aircraft electrical system without a regenerative absorption device coupled thereto.

18. The method as defined in claim 17, wherein the aircraft electrical system includes an engine driven generator or a fuel cell to provide continuous aircraft electrical power, and wherein the method further comprises the step of satisfying transient power requirements beyond that capable of being supplied under maximum continuous conditions by the engine driven generator or fuel cell, the satisfying transient power requirements performed by the bidirectional electrical accumulator.

19. The method as defined in claim 16, wherein the aircraft electrical system includes an engine driven generator, the method further comprising the steps of:
providing average continuous power by the engine driven generator to thereby satisfy average continuous power requirements;
providing supplemental power to the plurality of flight control actuators by the bidirectional electrical accumulator to thereby satisfy transient power requirements; and charging the bidirectional electrical accumulator by the engine driven generator when not encountering the transient power requirements to thereby maintain the bidirectional electrical accumulator at a minimum power level.

20. The method as defined in claim 19, wherein the aircraft electrical system includes at least one aircraft flight control actuation system bus electrically coupled to the plurality of flight control actuators and to the bidirectional electrical accumulator, and wherein the electrical bidirectional accumulator comprises at least one energy storage device and a corresponding at least one bidirectional power controller electrically coupled with the at least one energy storage device and to the at least one aircraft flight control actuation system bus, the method further comprising the step of:
   managing voltage between the at least one energy storage device and the at least one aircraft flight control actuation system bus by the at least one bidirectional power controller.

21. The method as defined in claim 16,
   wherein the plurality of flight control actuators is a first plurality of flight control actuators;
   wherein the bidirectional electrical accumulator includes:
      a first energy storage device electrically coupled to the first plurality of flight control actuators and redundantly coupled to a second plurality of flight control actuators, and
      a second energy storage device electrically coupled to the second plurality of flight control actuators and redundantly coupled to the first plurality of flight control actuators;
   wherein the step of absorbing regenerative power includes the first energy storage device absorbing excess electrical power regenerated by the first plurality of flight control actuators, and absorbing excess electrical power regenerated by the second plurality of flight control actuators when not sufficiently absorbed by the second energy storage device;
   wherein the method further comprises the steps of:
      the second energy storage device absorbing excess electrical power regenerated by the second plurality of flight control actuators and excess electrical power regenerated by the first plurality of flight control actuators when not sufficiently absorbed by the first energy storage device,
      the first energy storage device providing supplemental power to the first plurality of flight control actuators, and supplemental power to the second plurality of flight control actuators when not sufficiently provided by the second energy storage device, and
      the second energy storage device providing supplemental power to the second plurality of flight control actuators, and supplemental power to the first plurality of flight control actuators when not sufficiently provided by the first energy storage device.

22. The method as defined in claim 16,
   wherein the plurality of flight control actuators is a first plurality of flight control actuators;
   wherein the aircraft electrical system includes:
      an engine driven generator,
      a first aircraft flight control actuation system bus electrically coupled to the first plurality of flight control actuators, and
      a second aircraft flight control actuation system bus electrically coupled to a second plurality of flight control actuators;
   wherein the electrical bidirectional accumulator further comprises:
      a first energy storage device positioned to absorb excess electrical power regenerated by the first plurality of flight control actuators and to provide supplemental power to the first plurality of flight control actuators,
      a second energy storage device positioned to absorb excess electrical power regenerated by the second plurality of flight control actuators and to provide supplemental power to the second plurality of flight control actuators,
      a first bidirectional power controller electrically coupled to the first energy storage device and the first aircraft flight control actuation system bus, and
      a second bidirectional power controller electrically coupled to the second energy storage device and the second aircraft flight control actuation system bus; and
   wherein the method further comprises the steps of:
      managing voltage between the first energy storage device and the first aircraft flight control actuation system bus by the first bidirectional power controller, and
      managing voltage between the second energy storage device and the second aircraft flight control actuation system bus by the second bidirectional power controller.

23. The method as defined in claim 22, further comprising the steps of:
   providing average continuous power to the plurality of flight control actuators by the engine driven generator to thereby satisfy average continuous power requirements by the engine driven generator;
   providing supplemental power to the first plurality of flight control actuators by the first energy storage device to thereby satisfy transient power requirements thereof;
   providing supplemental power to the second plurality of flight control actuators by the second energy storage device to thereby satisfy transient power requirements thereof;
   charging the first energy storage device by the engine driven generator when not encountering the transient power requirements to thereby maintain the bidirectional electrical accumulator at a minimum power level; and
   charging the second energy storage device by the engine driven generator when not encountering the transient power requirements to thereby maintain the bidirectional electrical accumulator at a minimum power level.

24. The vehicle electrical system as defined in claim 23, wherein the first energy storage device comprises a capacitor having a minimum rating of 25 kilowatts, and wherein the second energy storage device comprises a battery having a minimum rating of 2.5 amp-hours.

* * * * *